No. 661,430. Patented Nov. 6, 1900.
J. TOMBEUR.
FIRE EXTINGUISHING APPLIANCE.
(Application filed Oct. 4, 1899.)
(No Model.) 2 Sheets—Sheet 1.
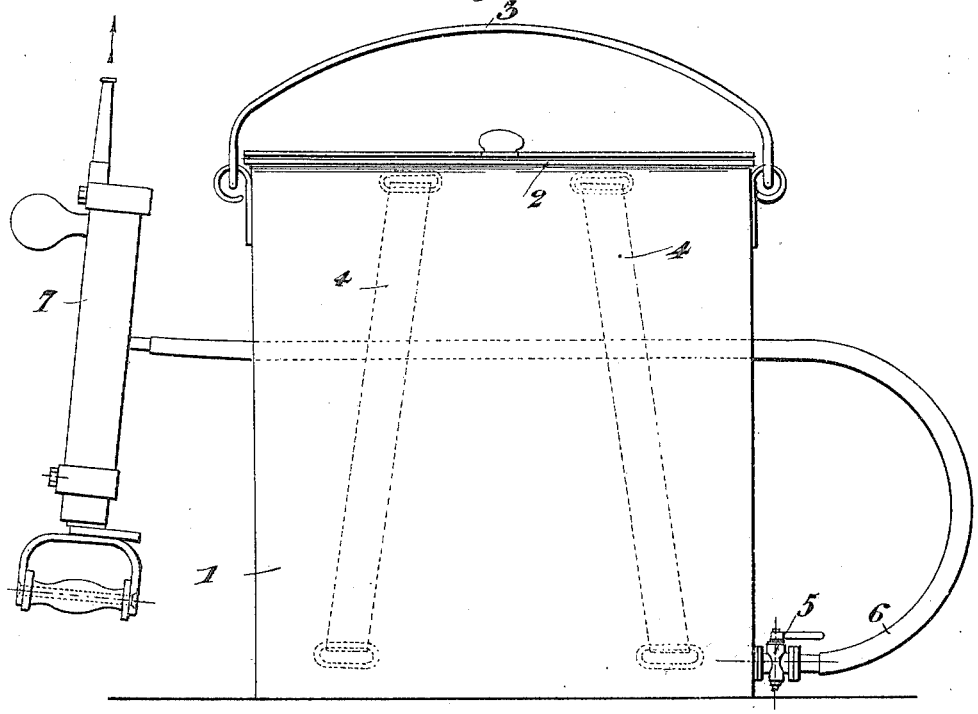
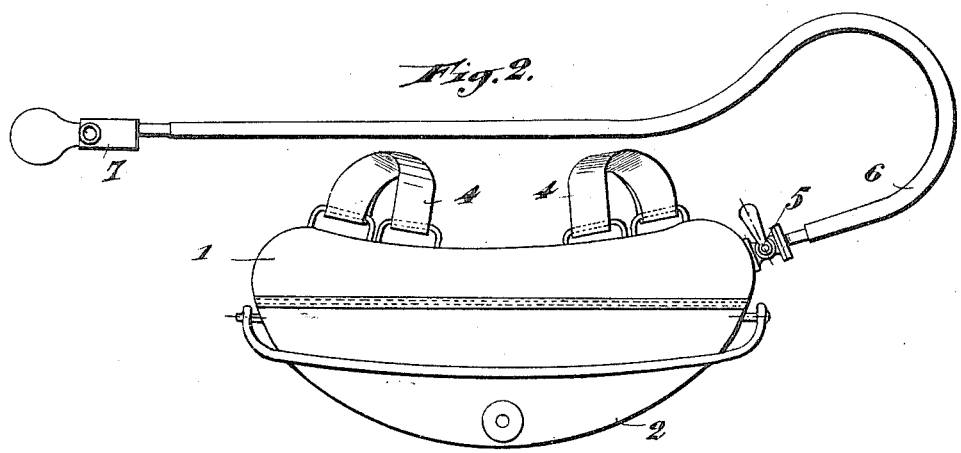

No. 661,430. Patented Nov. 6, 1900.
J. TOMBEUR.
FIRE EXTINGUISHING APPLIANCE.
(Application filed Oct. 4, 1899.)
(No Model.) 2 Sheets—Sheet 2.
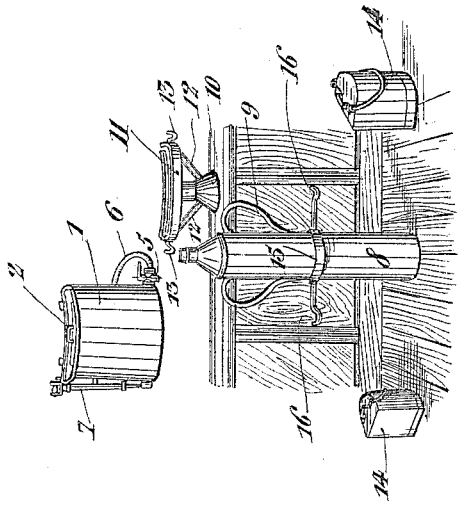
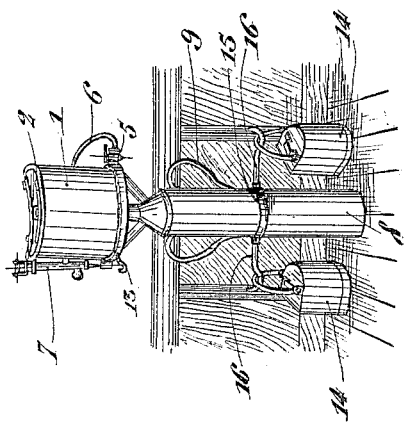
Witnesses
Inventor
Joseph Tombeur
Attorney

UNITED STATES PATENT OFFICE.

JOSEPH TOMBEUR, OF BRUSSELS, BELGIUM.

FIRE-EXTINGUISHING APPLIANCE.

SPECIFICATION forming part of Letters Patent No. 661,430, dated November 6, 1900.

Original application filed July 8, 1897, Serial No. 643,925. Divided and this application filed October 4, 1899. Serial No. 732,588. (No model.)

*To all whom it may concern:*

Be it known that I, JOSEPH TOMBEUR, a subject of the King of Belgium, and a resident of Brussels, Belgium, have invented certain new and useful Improvements in Fire-Extinguishing Appliances, of which the following is a specification, this application being a division of my earlier application, Serial No. 643,925, filed July 8, 1897.

My present invention relates to fire-extinguishing appliances, the object being to provide a portable fire-extinguishing apparatus which is most simple and very effective in practical use.

In order that this my invention may be the more readily understood and carried into practical effect, reference is hereby made to the accompanying drawings, wherein—

Figure 1 shows an elevation of the receptacle and appliances of the new fire-extinguisher. Fig. 2 is a top plan view of the same. Fig. 3 shows the fire-extinguisher, reservoir, support, and pails detached from each other; and Fig. 4 shows the improved apparatus complete and out of use.

In the drawings like numerals refer to like parts throughout all the figures.

Referring to the drawings, 1 represents a pail-like portable receptacle serving to contain the extinguishing compound or solution intended to be thrown upon the fire. The upper end of said receptacle is partially closed by means of a top part, as seen in Fig. 2, to which is hinged a cover 2. Said receptacle is provided with a handle 3, whereby the same may be easily carried in the hand, and with two straps 4 4, made of leather, fabric, or other suitable material, whereby the receptacle may be easily carried on the back of a person. To the lower part of the receptacle 1 is secured a cock 5, communicating with the interior of the receptacle and to which a rubber pipe 6 is secured, said pipe being suitably connected with any suitable sucking and forcing pump 7, serving to suck the fire-extinguishing liquid from the receptacle 1 and throw the same upon the fire.

The fire-extinguisher further comprises a suitable reservoir 8, provided with handles 9 for carrying the same and the upper end of which is beveled, as shown, to receive a corresponding hollow head 10, to which is secured a suitable plate or holder 11, braced to the head 10 by means of rods 12 and provided with hooks 13, from which pails 14 may be hung. The reservoir 8 is provided with a ring 15, suitably secured thereto and provided with hooks 16, from which pails 14 may be suspended, said pails serving to contain fire-extinguishing liquid to enable a person to throw the same directly upon the fire.

When the apparatus is out of use, it takes very little space and may be easily placed in a room, the reservoir 8 serving as a stand for the other parts of the apparatus, the head 10 being fitted over the end of said reservoir to support the receptacle 1 and the pails 14 being suspended from the hooks 13 and 16, as shown in Fig. 4 of the accompanying drawings.

When fire breaks out, the extinguishing liquid may be shed into the pails 14 and then readily thrown upon the fire, and if this is not practicable—that is, if the fire is not readily accessible—the extinguishing liquid is shed into the receptacle 1, which is then hung upon the back to enable a person to readily and easily force the extinguishing liquid upon the fire.

The aforegoing construction and arrangement results in a most simple and effective apparatus, as is readily understood.

Having fully described my invention, what I claim, and desire to secure by Letters Patent, is—

The combination with a reservoir, for containing fire-extinguishing liquid, said reservoir, having a beveled upper end, a corresponding hollow head fitted over said end, and hooks or equivalents, suitably secured to said reservoir and head and adapted to support pails, or other receptacles, of a suitable receptacle placed upon said head and serving to contain fire-extinguishing liquid, said receptacle provided with means for carrying same on the back; and a suitable sucking and forcing hand-pump, connected with said receptacle, substantially as and for the purpose set forth.

JOSEPH TOMBEUR.

Witnesses:
 ED STURM,
 GREGORY PHELAN.